June 15, 1943.  D. W. RANDOLPH  2,321,855
INDICATOR
Filed Jan. 17, 1940
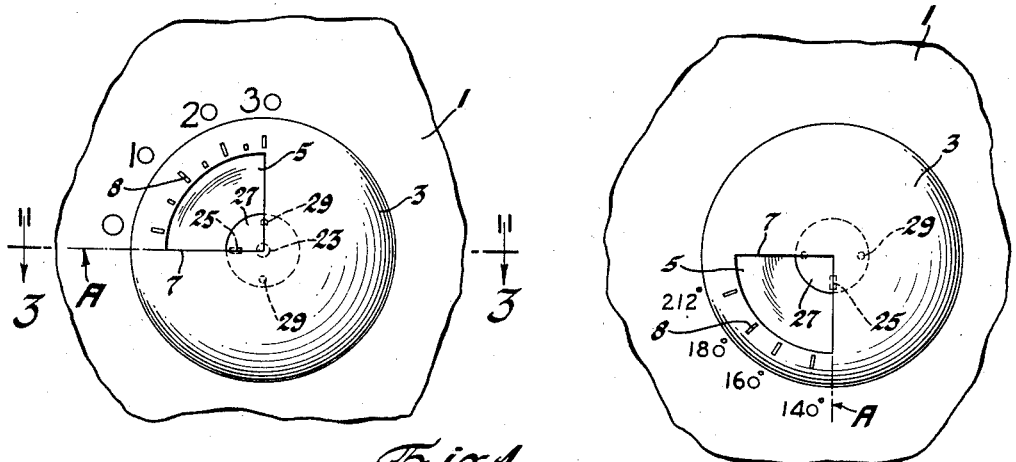
Fig. 1
Fig. 2
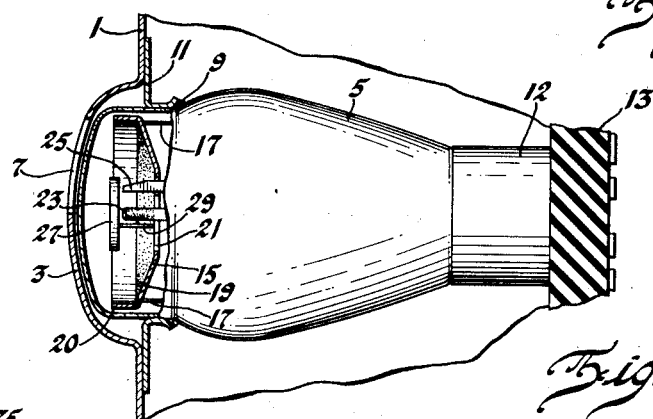
Fig. 3
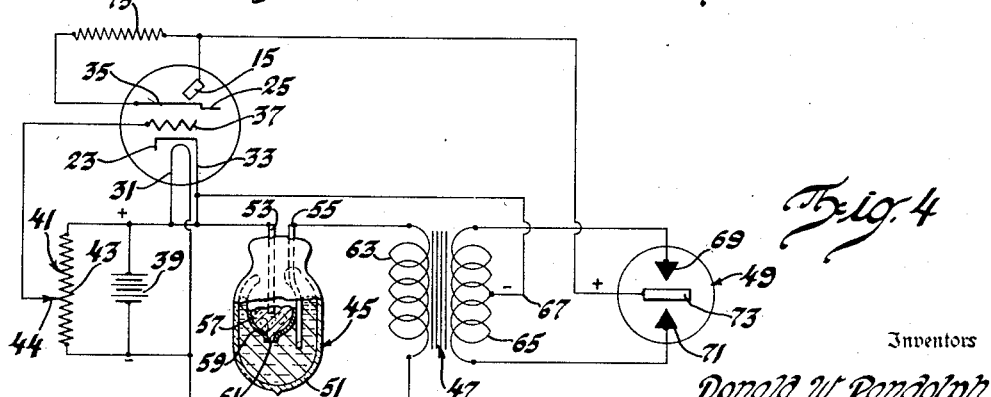
Fig. 4
Inventors
Donald W. Randolph
By Blackmore, Spencer & Flint
Attorney Patented June 15, 1943

2,321,855

UNITED STATES PATENT OFFICE 2,321,855

INDICATOR

Donald W. Randolph, Flint, Mich., assignor to General Motors Corporation, Detroit, Mich., a corporation of Delaware Application January 17, 1940, Serial No. 314,205

4 Claims. (Cl. 250—27.5)

The present invention relates to an indicator apparatus and particularly concerns apparatus for producing and varying the area or pattern of an electronic discharge visible on a fluorescent target of an electronic indicator tube to indicate various measurements.

Electrical measuring instruments having an indicating needle mounted on a moving element supported in bearings are subject to wear when subjected to vibration as the element is continuously oscillated unless damping means is provided. The use of an electronic indicator tube having a target on which a visible electronic discharge is used to give an indication of a variable measurable quantity instead of a moving element type instrument has been found to be extremely well suited for use on vehicles where vibration is present. These tubes, however, require the use of a constant value high voltage source of power for their operation which requires a converter for stepping up the vehicle battery voltage.

The present invention therefore has for its object a simple, compact and inexpensive indicating apparatus comprising an electronic indicator tube, a power supply therefor operating on a low voltage source and having no wearing parts and a source of variable voltage for controlling the indication visible on the indicator tube.

The combined means by which the above and associated objects are accomplished is described as follows and is illustrated in the following drawings, in which:

Figures 1 and 2 are views of a control panel having an opening, a calibrated scale adjacent thereto, and an electronic indicator tube located behind and visible through said opening;

Figure 3 is a longitudinal sectional view taken on line 3—3 of Figure 1 with the end portion of the indicator tube broken away to show details thereof and;

Figure 4 is a diagrammatic view of the combined electrical apparatus and the wiring diagram therefor.

As shown in Figures 1 to 3, a sheet metal instrument panel 1 is pressed outward at 3 for reception of the outer end of an electronic indicator tube 5. A 90 degree segmental opening 7 is provided in the panel 1 adjacent the end of the tube, and a scale 8 adjacent the arcuate edge of this opening allows the extent or area of the electronic discharging occurring in the end of the tube to be observed and measured. The outer end of the tube 5 extends through an opening 9 in a sheet metal flange 11 fixed to the rear side of the panel 1, for support therein, and the base 12 of the tube is supported in a conventional socket 13 which is supported in any suitable manner behind the panel.

The indicator tube 5 is of the so-called "magic eye" or 6E5 type and is a triode amplifier having indicating elements associated with the triode elements. As best shown in Figure 3, the indicating elements are located in the outer transparent end of the tube which is broken away to show details thereof. The triode elements which are located in the central portion of the tube and are supported from the press of the tube in the usual manner are not shown in Figure 3.

The indicating elements comprise a target 15 of dished form supported on rods 17 electrically connected thereto which are also sealed in the press of the tube, and one of which serves as a target conductor and extends outwardly therethrough. The internal conical surface 19 of the target is coated with a material which becomes visibly fluorescent when bombarded by electrons and the outer annular portion 20 adjacent thereto serves as a shield to prevent the electrons from reaching the internal surface of the tube. The target has a central opening 21 through the center of which extends the end 23 of the triode cathode from which electrons are emitted which bombard the target surface 19. A ray control electrode 25 also extends through the opening 21 in parallel relationship to the end 23 of the cathode to control the path of electron flow from the end 23 of the cathode to the conical surface 19 of the target 15. This ray control electrode is an extension of the triode plate and is electrically connected thereto as will be described later. When the coated conical surface 19 of the target is bombarded by electrons from the cathode it becomes visibly fluorescent. The area of the surface bombarded by the electrons is determined by the voltage impressed on the ray control electrode 25. As the ray control electrode 25 becomes more positive the greater the area of fluorescence on the target and at a predetermined value of the entire surface of the target becomes fluorescent. When the electrode 25 becomes less positive the electron bombardment of the target adjacent this electrode is reduced and a dark portion of segmental form appears on the target. This shadow increases angularly and circumferentially on either side of the dotted line indicated at A in Figures 1 and 2, which extends radially outward from the center of the target and passes through the center of the control electrode. The 6E5 tube shown is extremely sensitive to changes in voltage of the ray control electrode 25 in the range from zero dark area to approximately 100 degrees of dark area but other tubes are available which give a greater angular spread. The 90 degree segmental opening 7 allows one fourth of the area of the target to be observed and one radial edge of this opening coincides with line A so that one edge of the dark area adjacent the fluorescent areas serves as the indicator of variation of the shadow area and the fluorescent area, which may be measured on the scale 8. A cap or shield 27 is located adjacent the ends of the cathode and the ray control electrode to prevent the electrons from reaching the inner end surface of the tube. The cap is held in the center of the tube by rods 29, one of which is shown in Figure 3. These rods are welded to the cap and target at points 90 degrees from where the ray control electrode passes through the opening 21 in the target.

The tube elements, power supply means and control means for the tube are shown in diagrammatic form in Figure 4. The triode elements as well as the indicating elements of the tube are shown diagrammatically in this figure and the circuit connections from these elements to the power supply means are also shown. The triode heater or filament is indicated at 31, the cathode at 33, the plate at 35 and the grid at 37. The heater 31 is connected across a battery 39 which may be an ordinary 6-volt storage battery and the heater cathode 33 is connected to the positive terminal of this battery. The grid 37 is connected to a source of variable voltage and controls the voltage of the ray control electrode 25 and the fluorescent area variable on the target 15. The characteristics of the tube are such that the visible fluorescent area is proportional to the grid voltage. This variable voltage source may be supplied by any well known means, for example, by a generator, the terminal voltage of which is directly proportional to speed so that the tube will indicate speed. The means shown for varying the voltage is a potentiometer indicated at 41. This potentiometer comprises a resistance element 43 connected across the battery 39 so that a constant value of current flows therethrough, and a movable contact 44 is in electrical contact with the resistance and movable with respect thereto. The contact 44 is connected to the grid 37, and the voltage impressed thereon is proportional to the position the contact occupies on the resistance element. The grid, therefore, by this means can be made more or less positive by moving the contact along the resistance element to make the plate 35 and the ray control electrode 25 more or less positive with respect to the target 15, to control electron flow between the end 23 of the cathode to the target 15 so that the fluorescent area visible therein is proportional to the movement of the contact 44. The ray control element 25 is an extension of the plate 35, as best shown in Figure 4.

Any means, such as a temperature, pressure, or speed responsive device having an element movable in proportion to variations in any of these quantities may be operatively connected to the movable contact 44 to move it so that the variation in fluorescent area visible in the tube will indicate variations in any of these quantities. The scale 8 adjacent the end of the tube may be calibrated, therefore, to indicate temperature in degrees as shown in Figure 2 or pressure in pounds per square inch as shown in Figure 1 or in any other units desired.

The high voltage plate and target supply necessary for producing the electronic discharge in one or more indicator tubes is furnished by an interrupter 45, a transformer 47 and a triode rectifier 49. The interrupter comprises a glass tube 51 substantially filled with mercury and having two electrodes 53 and 55 extending into the tube and sealed in the walls thereof. The inner end of the electrode 53 is embedded in a tip 57 of high resistance material and is supported in an inwardly projecting tubular portion 59 of tube having a small opening 61 in the end thereof so that only a small area of the tip 57 is in contact with the mercury. The inner end of the other electrode 55 is positioned so that it is maintained in contact with the mercury at all times. The outer ends of the electrodes 53 and 55 are connected in series with the primary winding 63 of the transformer 47 and the battery 39, and the current flowing in this circuit causes the tip 57 to be heated sufficiently to vaporize the mercury in contact with the tip causing interruption of the current flow, which then allows the mercury to condense so that the circuit is again completed. This cycle of operation occurs at regular intervals, depending upon the physical dimensions of the parts of the interrupter. The constant frequency of current interruption in the primary coil induces a high voltage alternating current in the secondary coil 65 of the transformer, the center tap 67 of which is connected to the positive terminal of the battery and end taps of which are connected to electrodes 69 and 71 of the triode rectifier 49. The rectifier is of the full wave type and the positive or output electrode 73 is connected to the target 15 which is also connected to plate 35 through a resistor 75. The target and plate are thus maintained at a higher voltage than the battery and at substantially constant potential as the constant frequency interruptions of current in the primary coil of the transformer caused by the automatic mercury interrupter produce a constant frequency of flux interlinkages between the primary and secondary coils of the transformer and therefore a constant value of alternating current of high potential is impressed on the rectifier which rectifies the alternating current and is connected to the target and plate of the tube.

The operation of the indicator apparatus is as follows:

When the movable contact 44 of the potentiometer 41 is moved in either direction to make the triode grid 37 more or less positive, the triode plate 35 and ray control electrode 25 become more or less positive with respect to the target 15. When the potential of the plate and ray control electrode is substantially the same as that of the target 15, the entire conical surface 19 of the target becomes fluorescent and the radial edges of this fluorescent area meet on the line A shown in Figures 1 and 2. There is no current flowing in the triode plate circuit when this condition is reached and therefore no potential drop occurs across the resistor 75. When the contact 44 is moved to a different position the plate 35 and ray control electrode are made less positive with respect to the target 15 and current will flow in the plate circuit and a potential drop will occur across the resistor 75. The potential of the plate and ray control electrode under these conditions approaches the potential of the cathode 33 and a shadow or dark area of segmental form will appear on the target adjacent the ray control electrode. Each edge of the shadow will move angularly an equal amount away from the line A proportional to the voltage impressed on the grid, which is proportional to the distance the resistance contact 44 is moved by the particular measuring device which is operatively connected thereto. As only one edge of the shadow is visible through the opening 7 in the panel 1, this edge acts as a pointer and the scale 8 adjacent this opening may be divided and numbered corresponding to the units measured.

It will be evident that any number of indicator tubes may be mounted on an instrument panel to indicate various measurements. Each of these tubes may be connected to the battery and high voltage supply in the manner shown and described, the indication of each tube being controlled by the amount of voltage impressed on the grid 37 controlled by any measuring device. The measuring device may be located at any distance from the instrument panel or power source. The accuracy of the measurements visually observed on the tube target is due to the constant potential supplied to the tube for producing the electronic discharge; the variable voltage supplied to the grid causes a variation in the path of the electronic discharge to vary the visible fluorescent area proportional to the change in the grid voltage.

I claim:

1. An indicator comprising an electronic discharge tube having a target, said target having an annular surface coated with a fluorescent material, a cathode located centrally with respect to said annular target surface for causing an electron flow to said target coating to render it visibly fluorescent, an electrode radially spaced between said cathode and said annular target surface for controlling the path of electron flow between the cathode and target to vary the visible fluorescent area of the target coating and a scale of arcuate form located adjacent the annular target surface, said scale having a radial edge in alignment with said cathode and said electrode to measure the change in visible fluorescent area on the target coating.

2. An indicator comprising an electronic discharge tube having a target, said target having an annular surface coated with a fluorescent material, a cathode element located centrally with respect to the annular target surface to cause an electronic bombardment of the annular target surface to render it visibly fluorescent, a control electrode radially spaced between said cathode and said annular target surface to vary the path of electron flow to the target coating thereby to cause a variation in the visible fluorescent area thereon and a panel having a sector shaped opening through which only a sector shaped area of said annular target may be viewed and a scale adjacent the arcuate portion of the opening for measuring the angular variation in visible fluorescent area on said target.

3. An indicator comprising a multi-element electronic discharge tube having a target, said target having a dished annular surface coated with a fluorescent material, a cathode fixed centrally with respect to said annular target surface for causing an electronic bombardment thereof to render it visibly fluorescent, a control electrode radially spaced between said cathode and said dished annular target surface to vary the path of electron flow to the coating of said target and thereby vary the visible fluorescent area on said annular target surface, an opaque panel having a sector shaped opening and a scale on said panel adjacent the arcuate portion of the opening and means supporting said tube behind said panel opening with the arcuate portion of said opening located in concentric relation with said annular target surface and with one of the radii of the sector shaped opening located in radial alignment with both said cathode and said control electrode whereby variation in the fluorescent area on that portion of said annular target visible through the sector shaped opening may be accurately measured on said scale.

4. An indicator comprising a multi-element electronic discharge tube comprising a target coated with fluorescent material, a cathode adjacent the target, a control grid between the target and cathode, a panel covering a portion of said target, the edge of said panel being in alignment with said cathode and control grid, and a calibrated scale adjacent said target and the edge of said panel to measure the change in visible fluorescent area on the target coating.

DONALD W. RANDOLPH.